United States Patent

3,634,779

[72] Inventor: Thomas G. Crow, Orange County, Fla.
[21] Appl. No.: 839,521
[22] Filed: July 7, 1969
[45] Patented: Jan. 11, 1972
[73] Assignee: International Laser Systems, Inc., Orlando, Fla.

[54] HIGH-INVERSION LASER DEVICE HAVING AN IMPREGNATED FLASHTUBE JACKET, AN ULTRAVIOLET ABSORBING FILTER BETWEEN THE LASER ROD AND THE FLASHTUBE AND A FILTER WITHIN THE LASER ROD
2 Claims, 6 Drawing Figs.

[52] U.S. Cl. .................................................. 331/94.5, 313/112, 313/221
[51] Int. Cl. .................................................. H01s 3/09
[50] Field of Search .................................................. 331/94.5; 313/112, 221

[56] References Cited
UNITED STATES PATENTS

| | | | |
|---|---|---|---|
| 3,445,785 | 5/1969 | Koester et al. | 331/94.5 |
| 2,919,369 | 12/1959 | Edgerton | 313/221 |
| 3,356,966 | 12/1967 | Miller | 331/94.5 |
| 3,467,916 | 9/1969 | Ley et al. | 331/94.5 |
| 3,512,104 | 5/1970 | Miller | 331/94.5 |

Primary Examiner—Ronald L. Wibert
Assistant Examiner—Edward S. Bauer
Attorney—Duckworth and Hobby

ABSTRACT: A laser apparatus for reaching a high-inversion level by the reduction of transverse depumping mechanisms, having a laser rod optically coupled to a pumping flashlamp capable of producing lasing action. The inversion level of the laser rod is improved by a filter for absorbing radiation within the lasing wavelength while being substantially transparent to the pumping wavelength. A portion of the filtering system is located inside the laser rod while another portion may be in the quartz envelope of the flashlamp or in other locations, as desired.

PATENTED JAN 11 1972

3,634,779

THOMAS G. CROW
INVENTOR.

BY Duckworth & Hobby

Attorneys

HIGH-INVERSION LASER DEVICE HAVING AN IMPREGNATED FLASHTUBE JACKET, AN ULTRAVIOLET ABSORBING FILTER BETWEEN THE LASER ROD AND THE FLASHTUBE AND A FILTER WITHIN THE LASER ROD

BACKGROUND OF THE INVENTION

The present invention relates to lasers or optical masers, as they are sometimes called, and particularly to a laser device especially adapted for reaching high-inversion levels by the reduction of transverse depumping mechanisms within the laser cavity. The operation of a laser is based upon the fact that the atomic systems represented by the molecules of the laser rod material can exist in any of a series of discreet levels or states with the molecules absorbing energy in the optical frequency range and going to a higher state and emitting it when going to a lower state. In the case of a ruby rod three energy levels are utilized; the atomic systems are raised from the lower or ground level to the higher of the three levels by irradiation from a strong light source which need not be coherent but should preferably have a high concentration of energy in the shorter wavelengths. A radiationless transition then occurs from the higher state to an intermediate state. This is followed by a transition with photon emission from the intermediate state back to the ground state. It is the last transition that is of interest, since this transition is the source of the coherent light produced by the laser. The operation of raising the energy level of the laser to produce desired photon emission is referred to in the art as pumping. Pumping of the atoms in the laser rod by an optical light beam induces energy transitions of the atoms from a first or ground quantum energy level to a higher quantum energy level. As a result of the optical pumping, many (dependent upon the strength of the pump) of the atoms originally in the first energy level of the ground state are pumped up to the energy levels of an optically excited state. From this excited energy state, the atoms spontaneously decay to the ground state energy level. A population inversion suitable for lasing is said to occur in a three level system when the number of atoms in the excited state exceeds that of those in the ground state. A four level system (such as neodymium) requires only a small number of atoms in the excited state to lase. When pumping of the laser rod produces a certain critical density in the inversion level, depumping of the laser rod will be produced by the transverse laser operation within the rod. This depumping results from the output of the flashlamp in depumping or laser emission wavelengths, as well as by spontaneous omission of the lasing wavelengths from within the laser rod. These depumping mechanisms tend to deplete the inversion level while producing no useful output and should be eliminated as far as possible when a critical depumping level is reached, and when it is desired to obtain higher energy output levels. In order to obtain greater Q-switched energy, a larger volume of laser material may be used and filtering material may be utilized to eliminate or minimize the lasing wavelength reaching the rod from the lamp and from other portions of the rod directly or by reflection within the cavity of the laser. In a Q-switched type system when a laser rod is surrounded by high-reflectivity walls of a pump cavity, laser oscillations occur in the transverse mode within the pump cavity. When the gain coefficient reaches a sufficiently high level, these oscillations act as a depumping mechanism and limit the obtainable inversion levels within the rod and the maximum output of the laser. Accordingly, it is an object of the present invention to provide a high-inversion level laser device by reduction of transverse depumping mechanisms within the laser cavity.

In the past various types of filters have been suggested for use within laser devices. Most of these prior art filters have been directed towards eliminating ultraviolet and other wavelengths not needed in pumping the laser rod to avoid unnecessary heating of the laser rod. It has also been suggested to optically filter the pumping light beam to obtain a more monochromatic pumping light in a preselected wavelength to increase the efficiency of the pumping process.

Finally, it has been suggested to surround the active laser core with a cladding of glass adapted to absorb at the laser emission wavelength to reduce the optical depumping mechanism.

SUMMARY OF THE INVENTION

The present invention is a high-inversion level laser device having a laser system capable of producing a coherent beam of electromagnetic radiation in the lasing wavelength and having a pumping device, or flashlamp, optically coupled to the laser rod within a laser cavity for producing a high-intensity optical radiation in the pumping frequency of the laser material. An absorption filter which absorbs at the laser emission wavelength and transmits at the laser absorption wavelength is located within the laser rod. This filter material may be located within the laser rod in several ways including inserting a cylindrical filter rod in a center bore drilled in the laser rod so that transverse depumping mechanisms will be absorbed as they pass through the laser rod and through the center core.

A second desirable location for the filter material may be located in a cross section through the laser rod with the laser rod showing four quarter sections in a cross section of the laser rod.

Finally it is suggested to provide additional absorption filters by having the flashlamp quartz envelope impregnated with the filter-absorbing material and by the placing of additional filtering material at locations between the flashlamp and the laser rod.

BRIEF DESCRIPTION OF THE DRAWINGS

Other objects, features and advantages of this invention will be apparent from a study of the written description of the drawings in which.

DESCRIPTION OF THE PREFERRED EMBODIMENTS

Figure 1:
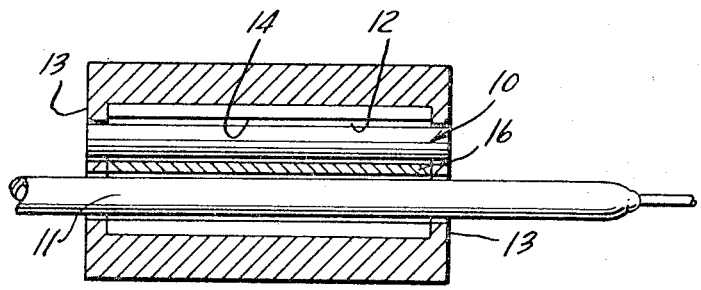
FIG. 1 is a cutaway sectional view of the laser cavity.

Referring now to FIG. 1, an embodiment is shown of a laser device having a laser rod 10, flashlamp 11 being held in a chamber 12 by end walls 13. Chamber 12 allows the easy circulation of a coolant, or the like, and has internal reflector surfaces 14 for reflecting radiation from the flashlamp 11 into the laser rod 10.

Figure 2:
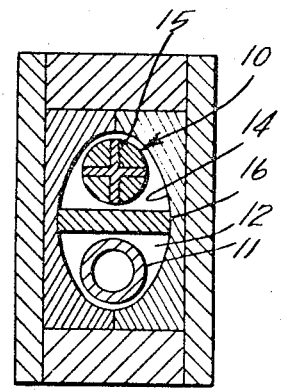
FIG. 2 is a cross section of the embodiment of FIG. 1.

FIG. 2 shows a cross-sectional view with laser rod 10 which may be seen as having a filter 15 therein in the shape of a cross-dividing laser rod 10 into four sections or quadrants. This view also illustrates the flashlamp 11, cavity 12 with internal reflector walls 14. As can be seen, there is a filter 16 located between the flashlamp 11 and the laser rod 10. Laser rod 10 in this embodiment may be a Yttrium Garnet or YAG rod of preferably a neodymium ion doping ($ND^{3+}YAG$). While applicant does not intend to be limited to any particular type of laser rod YAG is one of the most versatile crystalline host materials for solid lasers and may be readily single or double doped with impurities. Filter material 15 is adapted for absorbing radiation in the lasing wavelength, or laser emission wavelength and to transmit in the laser absorption wavelength, and in the case of YAG neodymium rod an absorption filter of Samarium glass which absorbs radiation in the 1.06 micron wavelength has proved effective.

In the inversion level in laser rod 10 reaches a sufficiently high level, depumping of the laser rod by transverse laser mechanisms begins to occur because of the output of the flashlamp in a laser emission frequency, such as 1.06 microns for the YAG neodymium rod, and also from spontaneous emission from points within the laser rod. The filter 15 is ideally located within the laser rod 10 dividing the laser rod 10 into sections adapted to absorb the transverse laser operation from points within the laser rod and prevent the critical depumping, thus allowing a high-energy output level to be reached by the laser. However, since the depumping mechanisms also result from the flashlamp radiation, a filter 16 has been provided of the same material as filter 15, and filters out radiation in the laser emission wavelengths originating in the flashlamp or in reflections from the flashlamp.

As can be readily seen by those skilled in the art, locating an absorption filter within the laser emission wavelength which transmits at the laser absorption wavelength within the laser rod itself in such a manner as to absorb transverse emissions within the laser rod prior to the depumping mechanisms achieving any degree of depumping from points within the laser rod will increase the inversion level that may be reached by the laser rod. Filter 16, while suitably placed between the flashlamp and the laser rod could be located within the quartz jacket to flashlamp 11 provided the quartz jacket were manufactured with a filtering material of the absorption wavelength from the flashlamp therein, and similarly, it could be provided by surrounding either the flashlamp, the laser rod or both with an absorption filter.

Figure 3:
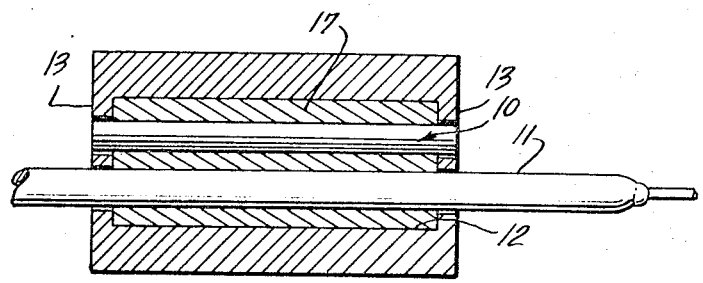
FIG. 3 is a cutaway sectional view of a second embodiment.
Figure 4:
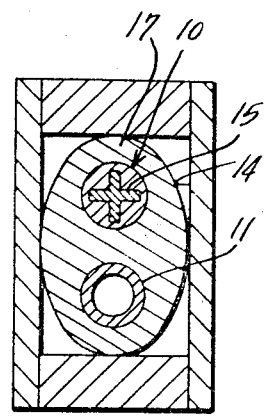
FIG. 4 shows a cross section of the embodiment of FIG. 3.

Turning now to FIG. 3 and 4, there can be seen a second embodiment of the present invention having end walls 13 of cavity 12 holding flashlamp 11 and laser rod 10, and which laser rod 10 and flashlamp 11 are completely surrounded by absorption filter 17 which replaces the absorption filter 16 of the embodiments of FIGS. 1 and 2. This can be more clearly seen in FIG. 4 which shows filter 17 and absorption filter 15 located within the laser rod 10 and flashlamp 11. The external walls of the absorption filter may be mirrored to form cavity 14 and will be highly reflective in this embodiment as in the one of FIGS. 1 and 2. This embodiment advantageously absorbs radiation from the flashlamp within the laser emission wavelength and emits directly from the flashlamp as well as being reflected from the reflective surfaces 14, while transmitting at the laser absorption wavelength. Filter 15 located within the laser rod filters the transverse laser emission wavelength emanating from points within the laser rod as well as those passing through the rod from exterior of the laser rod.

Figure 5:
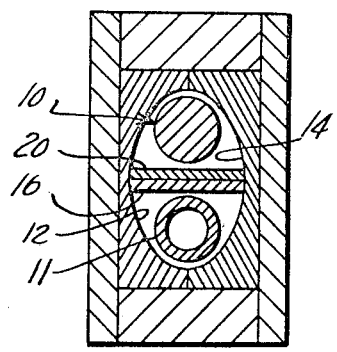
FIG. 5 shows a cross section of yet a third embodiment of the present invention.

The embodiment of FIG. 5 which is seen only in a cross-sectional view, illustrates the use of a flashlamp 11, laser rod 10 in which the flashlamp 11 may be impregnated with a filtering medium for filtering the laser emission wavelength and in which cavity 12 has reflective internal surfaces 14 and the laser emission wavelengths absorption filter 16. This embodiment also illustrates a second filter 20 which may be utilized to filter out undesirable ultraviolet light, and the like, to prevent additional heating, and the like, within the laser rod 10; it being of course realized that cavity 12 will normally be used for passing a coolant to maintain the flashlamp 11 and laser rod 10 from overheating.

Figure 6:
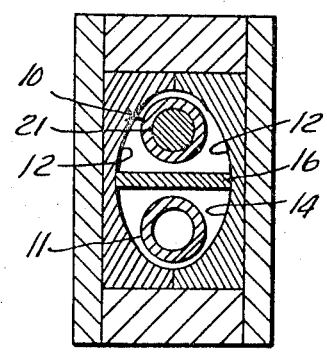
FIG. 6 shows yet another embodiment of the present invention.

FIG. 6 shows yet another embodiment in which the laser rod 10 has an internal absorption filter 21 which is cylindrical shaped and absorbs at the laser emission wavelength. This embodiment has the advantage of being relatively easy to manufacture since a bore can be drilled in the center of the laser rod 10 and a cylindrical filter 21 inserted therein. This embodiment also shows cavity 12 having internal reflector surfaces 14, flashlamp 11 and a filter 16 located between the flashlamp and the laser rod for filtering out transverse laser emission wavelengths from the flashlamp and from reflections from the surface 14.

As can be seen at this point, a laser device has been provided in which a high level of inversion may be reached by the reduction of the transverse depumping mechanisms within the laser cavity. It will, of course, be clear that the inventor does not intend to be limited to the embodiments as illustrated, and to the particular materials suggested for use in the laser and filters.

This invention is not to be construed as limited to the particular forms disclosed herein, since these are to be regarded as illustrative rather than restrictive.

I claim:
1. A high-inversion level laser apparatus comprising in combination:
   a. a laser rod capable of producing a coherent beam of electromagnetic radiation in a first wavelength, said laser rod having a hollow portion therein dividing said rod into segments;
   b. pumping means optically coupled to said laser rod for producing a high intensity of optical radiation in a second wavelength;
   c. first filter means adapted to absorb radiation in said first wavelength, said first filter means being substantially transparent to said second wavelength;
   d. said first filter means having at least one said filter medium shaped to match said hollow portion of said laser rod and located within said laser rod, dividing said laser rod into sections whereby transverse emissions are absorbed within said laser rod between said sections;
   e. a second filter means located between said pumping means and said laser rod and including an ultraviolet filter located between said pumping means and said laser rod; and
   f. said pumping means having a flashlamp, said flashlamp having a quartz jacket impregnated with a material for filtering out said first wavelength while transmitting said second wavelength whereby a high-inversion level laser is provided.

2. The apparatus according to claim 1 in which said filter medium divides said rod into four sections.

* * * * *